United States Patent [19]

Iyoda et al.

[11] 4,374,387

[45] Feb. 15, 1983

[54] DEFLECTING DEVICE IN INK JET PRINTER

[75] Inventors: Tetsuo Iyoda; Masatsugu Kikuchi, both of Ebina, Japan

[73] Assignee: Fuji Xerox Co., Ltd., Tokyo, Japan

[21] Appl. No.: 270,722

[22] Filed: Jun. 5, 1981

[30] Foreign Application Priority Data

Jul. 4, 1980 [JP] Japan .................................. 55-90583

[51] Int. Cl.³ .............................................. G01D 15/18

[52] U.S. Cl. ....................................................... 346/75

[58] Field of Search .................................. 346/75, 140

[56] References Cited

U.S. PATENT DOCUMENTS 4,184,167 1/1980 Vandervalk .................... 346/140 H 4,210,920 7/1980 Burnett et al. ........................ 346/75

*Primary Examiner*—Stafford D. Schreyer

*Attorney, Agent, or Firm*—Sughrue, Mion, Zinn, Macpeak & Seas

[57] ABSTRACT

An ink jet printer which does not utilize high voltage potentials to deflect non-printing ink particles. Nozzles are arranged in two parallel lines to jet ink particles. These ink particles pass between first and second parallel electrodes disposed between the nozzles and a recording medium. The non-printing ink particles from both lines of nozzles are charged with the same polarity. The repulsive force between the two lines of particles and the induced charges in the electrodes force the non-printing ink particles towards the electrodes. In one embodiment, the electrodes are solid plates and a gutter is provided between ends of the plates and the recording medium to recover ink particles, while in a second embodiment, the electrodes are metal meshes and a suction device is provided behind the meshes to collect the non-printing ink particles.

4 Claims, 3 Drawing Figures

DEFLECTING DEVICE IN INK JET PRINTER

BACKGROUND OF THE INVENTION

The present invention relates to a deflecting device in a two-valued charge type multi-nozzle ink jet printer.

In a two-valued charge type multi-nozzle ink jet printer, ink particles not used for printing (hereinafter referred to as "non-printing ink particles" when applicable) are charged so as to be deflected perpendicularly to the jet of ink particles by a deflecting device. The deflected particles are then recovered. On the other hand, ink particles used for printing are not charged and pass straightly through the deflecting device and strike the recording medium thereby to record a dot thereon.

In a conventional two-valued charge type ink jet printer, a high voltage is applied across the deflecting electrodes to create a deflecting electrodes field therebetween. The ink particles are injected into the electric field thus created and the non-printing ink particles are deflected perpendicularly to the direction of ink particles jet and are then recovered by a gutter.

The above-described conventional deflecting device suffers from the following difficulties:

(1) If dust particles from the ambient atmosphere have collected on the deflecting electrodes, an electrical discharge may occur between the deflecting electrodes or between the deflecting electrodes and other member at ground potential.

(2) Since a high voltage is applied thereto, the deflecting electrodes must be electrically insulated from conductors at ground potential. Thus, the structure and layout of the deflecting electrodes are limited making the manufacture of the device complex.

(3) Due to the presence of the high voltage, the distance between the deflecting electrodes and the recording medium must be large due to safety considerations. Therefore, the ink particles must fly through a relatively long distance to the recording medium.

(4) In a deflecting device for ink particles formed by nozzles positioned in a staggered arrangement, a deflecting electrode is provided between two ink particle lines and a high voltage is applied to the electrode to deflect the ink particles in opposite directions. Therefore, it is necessary to provide at least one deflecting electrode to which the high voltage is applied and two other deflecting electrodes at ground potential.

SUMMARY OF THE INVENTION

Accordingly, an object of the present invention is to provide a deflecting device in which no high voltage is employed in order to eliminate the above-described difficulties accompanying a conventional deflecting device.

A specific feature of the invention resides in an ink jet printer having nozzles arranged in two parallel lines in which non-printing ink particles jetted by the nozzles are charged to have the same polarity. The non-printing ink particles together with printing ink particles are directed to pass between two deflecting electrodes at the same potential.

More specifically, the invention provides an ink jet printer having a plurality of nozzles arranged in two parallel lines and a deflecting device including first and second parallel electrodes disposed between the nozzles and a recording medium. Non-printing ink particles jetted by the nozzles pass between the electrodes and are charged by the electrodes with the same charge polarity. To accomplish this, equal low voltage potentials are applied to both of the electrodes. Induced mirror image charges in the electrodes attract charged particles from a corresponding one of the two lines of nozzles.

In one embodiment, the electrodes are constructed as parallel metal plates. In another embodiment, metal meshes form the electrodes. In the first embodiment, recovering gutters are disposed between ends of the electrodes and the recording medium to collect non-printing ink particles, while in the second embodiment, a suction device is provided behind the meshes to collect the non-printing ink particles.

DESCRIPTION OF THE PREFERRED EMBODIMENTS

The invention will be described with reference to preferred embodiments thereof.

Figure 1:
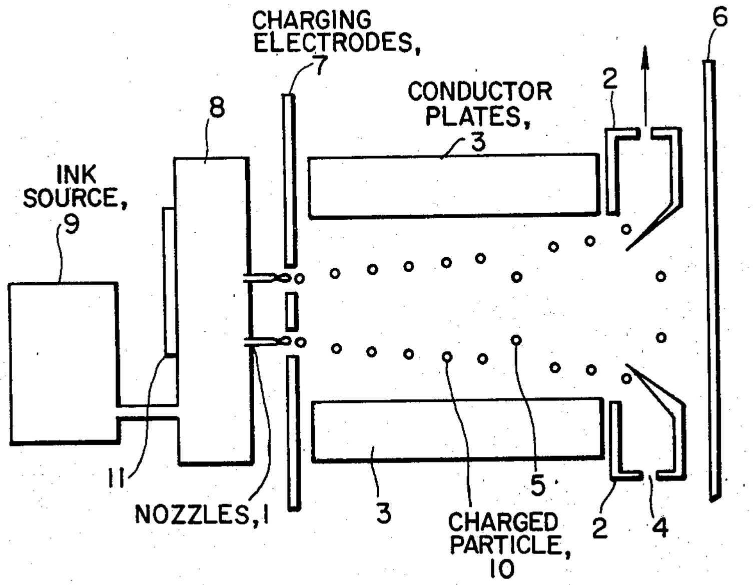
FIG. 1 is a schematic diagram showing a first preferred embodiment of an ink jet printer of the invention.

FIG. 1 shows a preferred embodiment of an jet printer constructed in accordance with the invention. Ink supplied from an ink supplying source 9 is jetted through nozzles 1 which are arranged in two lines and which are connected to a jet head 8. In this operation, as the jet head 8 is vibrated by a vibrator 11, ink particles are formed from the supplied ink. The nozzles 1 are arranged in two lines, specifically, in upper and lower lines, so that parallel lines of ink particle are formed. The parallel ink particle lines are charged selectively according to printing data by a charging electrode 7. All the charges applied to the ink particles have the same sign.

The ink particle lines thus charged, due to the repulsive electrostatic force acting between the ink particles in the upper and lower lines, are deflected towards respective conductor plates 3. In this operation mirror image charges of the ink particles are created on the conductor plates 3 so that the charged ink particles 10 are further deflected towards the conductor plates 3. This is due to the following reason: The ink particle lines are jetted near the conductor plates rather than near the mid point between the conductor plates. Therefore, the mirror image charges created on the upper and lower conductor plates are different in strength for each particle line and hence the charged ink particles are attracted towards the nearer conductor plate.

The charged particles thus deflected are collected in recovering gutters 2 and then pass through suction outlets 4. On the other hand, ink particles 5 used for printing are not charged and therefore pass straightly between the conductor plates and finally strike a recording medium 6 to print characters or other patterns thereon.

In order for the mirror image charges to effectively contribute to the deflection of the ink particles, the quantity of charge on a charged ink particle and the mutual positional relationships between the conductor plates and the upper and lower ink particle lines must be properly set.

A specific example of an ink jet printer of the invention is as follows:

Mass of an ink particle: $2\times10^{-7}$ g

Quantity of charge: 1 pC

Distance between a conductor plate 3 and the ink particle line adjacent thereto: 0.5 mm Distance between the upper and lower ink particle lines: 0.5 mm Particle speed: 10 m/sec Additionally, the length of the recovering gutter 2 in the direction of movement of charged particles may be of the order of 10 mm.

Figure 2:
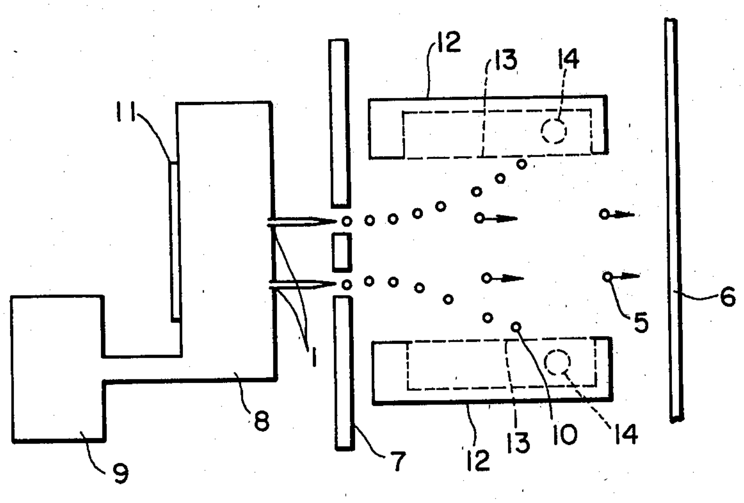
FIG. 2 is a schematic diagram showing a second embodiment of an ink jet printer of the invention.

Another embodiment of the invention is shown in FIG. 2. In FIG. 1 and FIG. 2, like parts are designated by like reference numerals. However, in FIG. 2, reference numeral 12 designates recovering gutters, reference numeral 13 metal meshes, and reference numeral 14 suction outlets.

In this embodiment, the recovering gutter 2 and the conductor plate 3 in the first embodiment (FIG. 1) are formed as a single unit using the metal mesh 13. The use of the metal mesh 13 is advantageous also in the creation of the mirror image charges. That is, the charged particles are deflected by the mirror image force and the repulsive force between the two ink particle lines and reach the metal meshes as shown in FIG. 2. The charged non-printing ink particles are recovered through the suction outlets 14.

Figure 3:
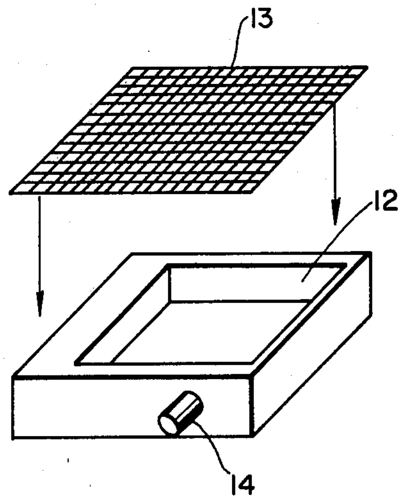
FIG. 3 is an exploded perspective view showing a part of the ink jet printer of FIG. 2.

FIG. 3 is an exploded perspective view showing the deflecting metal mesh 13, the recovering gutter 12 and the suction outlet 14 which are employed in the second embodiment (FIG. 2).

In the second embodiment, unlike the first embodiment, no gutter is provided between the deflecting electrodes and the recording medium therefore simplifying the construction of the device.

As is apparent from the above description, in the ink jet printer of the invention, the charged particles are deflected by the repulsive force between two particle lines and the induced mirror image charges. Therefore, a high voltage for creating a deflecting electric field is unnecessary. Accordingly, the invention provides the following advantageous effects:

(1) Even if dust is collected on the deflecting electrodes, no electrical discharge can occur between the deflecting electrodes and between the deflecting electrodes and other members at ground potential.

(2) Since no high voltage is applied to the deflecting electrodes, the structure and layout of the deflecting electrodes can be simplified, and the distance between the deflecting electrodes and the recording medium can be reduced.

(3) In the conventional two-valued charge type ink jet printer using two ink particle lines, a deflecting electrode is interposed between the two ink particle lines and a high voltage is applied to the deflecting electrode. However, with the invention, such a deflecting electrode is unnecessary.

What is claimed is:

1. An ink jet printer comprising: a plurality of nozzles, said nozzles being arranged in two parallel lines; a charging electrode disposed adjacent outlets of said nozzles for selectively charging ink jet particle pairs jetted by said nozzles; and a deflecting device including first and second parallel electrodes disposed between said nozzles and a recording medium, equal low voltage potentials being applied to both said parallel electrodes, uncharged ink particles jetted by said nozzles passing between said electrodes and wherein, a potential applied to said charging electrode for charging selected pairs of said jetted ink particles, said equal low voltage potentials applied to said parallel electrodes, a distance between said nozzles, and distances between each path of said uncharged jetted ink particles and a respective most closely adjacent one of said parallel electrodes being mutually set so that charged pairs of said jetted ink particles are repulsed by one another and attracted to a corresponding one of said parallel electrodes so as to move out of a printing particle area before reaching said recording medium.

2. The ink jet printer of claim 1 wherein said first and second electrodes comprise parallel plates and further comprising recovering gutters disposed between ends of said plates and said recording medium.

3. The ink jet printer of claim 1 wherein said electrodes each comprise a conductive mesh and further comprising suction outlets disposed adjacent said mesh for recovering ink particles therein.

4. The ink jet printer of any one of claims 1–3 wherein each line of said nozzles is disposed adjacent an end of a corresponding one of said electrodes away from a center line between said electrodes.

* * * * *